United States Patent [19]

Scheier et al.

[11] Patent Number: 4,827,570
[45] Date of Patent: May 9, 1989

[54] METHOD AND APPARATUS FOR REMOVING BREAST MEAT FROM POULTRY CARCASS

[75] Inventors: Donald J. Scheier, Kansas City, Mo.; Jack L. Hathorn, Springdale, Ark.

[73] Assignee: Simon-Johnson, Inc., Kansas City, Kans.

[21] Appl. No.: 147,703

[22] Filed: Jan. 25, 1988

[51] Int. Cl.$^4$ .............................................. A22C 21/00
[52] U.S. Cl. ............................................ 17/46; 17/11
[58] Field of Search ................................. 17/11, 46, 61

[56] References Cited

U.S. PATENT DOCUMENTS

| | | | |
|---|---|---|---|
| 4,557,017 | 12/1985 | Gasbarro | 17/11 |
| 4,593,432 | 6/1986 | Hazenbroek | 17/46 |
| 4,648,155 | 3/1987 | Burnett | 17/46 |
| 4,648,156 | 3/1987 | Meyn | 17/11 X |

Primary Examiner—Willie G. Abercrombie
Attorney, Agent, or Firm—Hovey, Williams, Timmons & Collins

[57] ABSTRACT

Apparatus for fileting breast meat and removing tenders and wings from a front poultry section includes two pairs of rotary cutters which are mounted for swinging movement in front of the path of the poultry carcass which is carried on a mandrel. The two pairs of rotary cutters provide slightly overlapping cuts to partially sever the connection between the wings and the carcass at precise locations consistent from bird to bird. Downstream of the rotary cutters, two pairs of depending peeling fingers incrementally slice through connections between the tenders and the sternum and a pair of wiping elements mounted for pivotal movement swing inwardly around the severed shoulder joint to firmly engage the carcass and peel away the remaining connections and the tenders and the sternum.

14 Claims, 8 Drawing Sheets

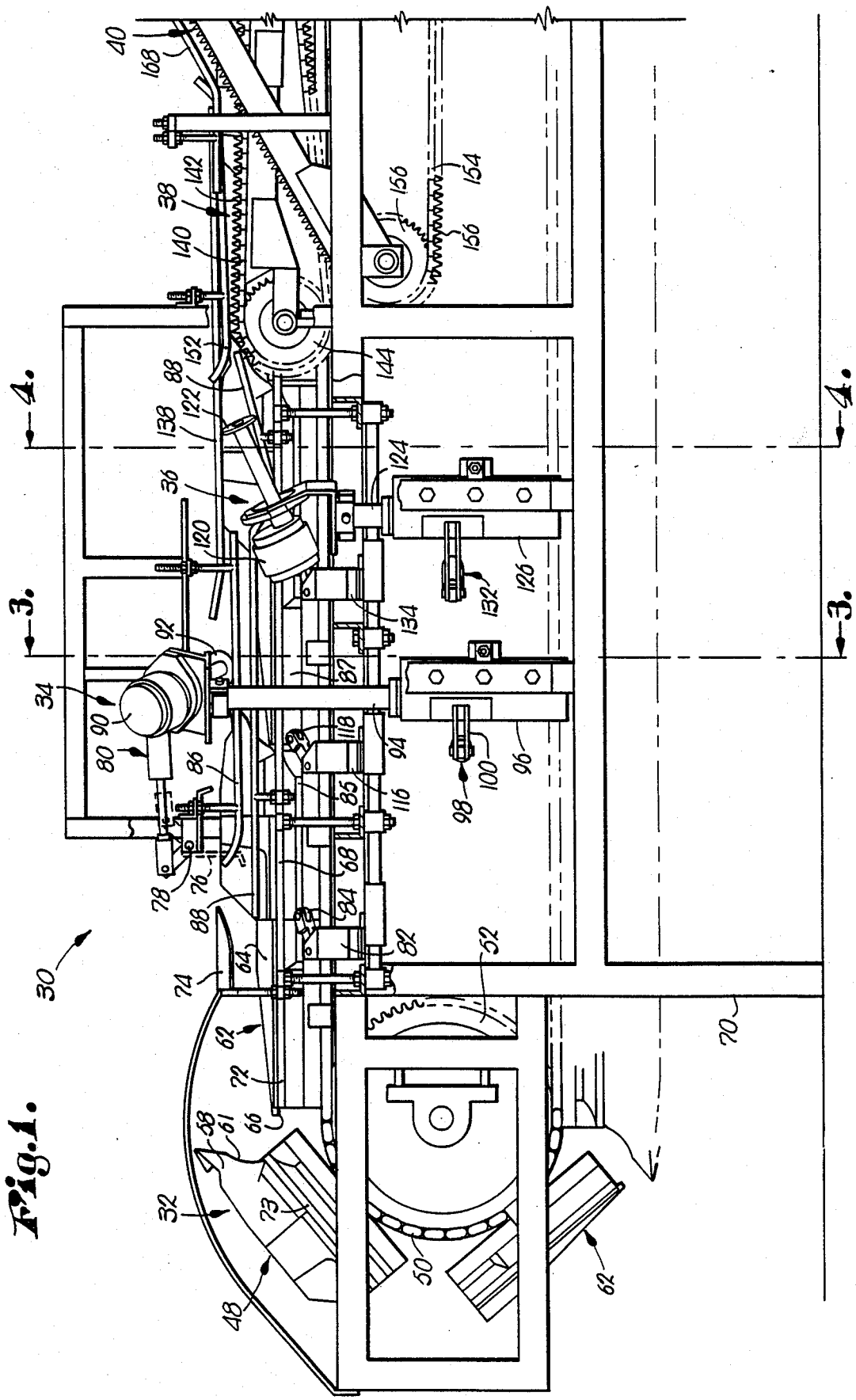

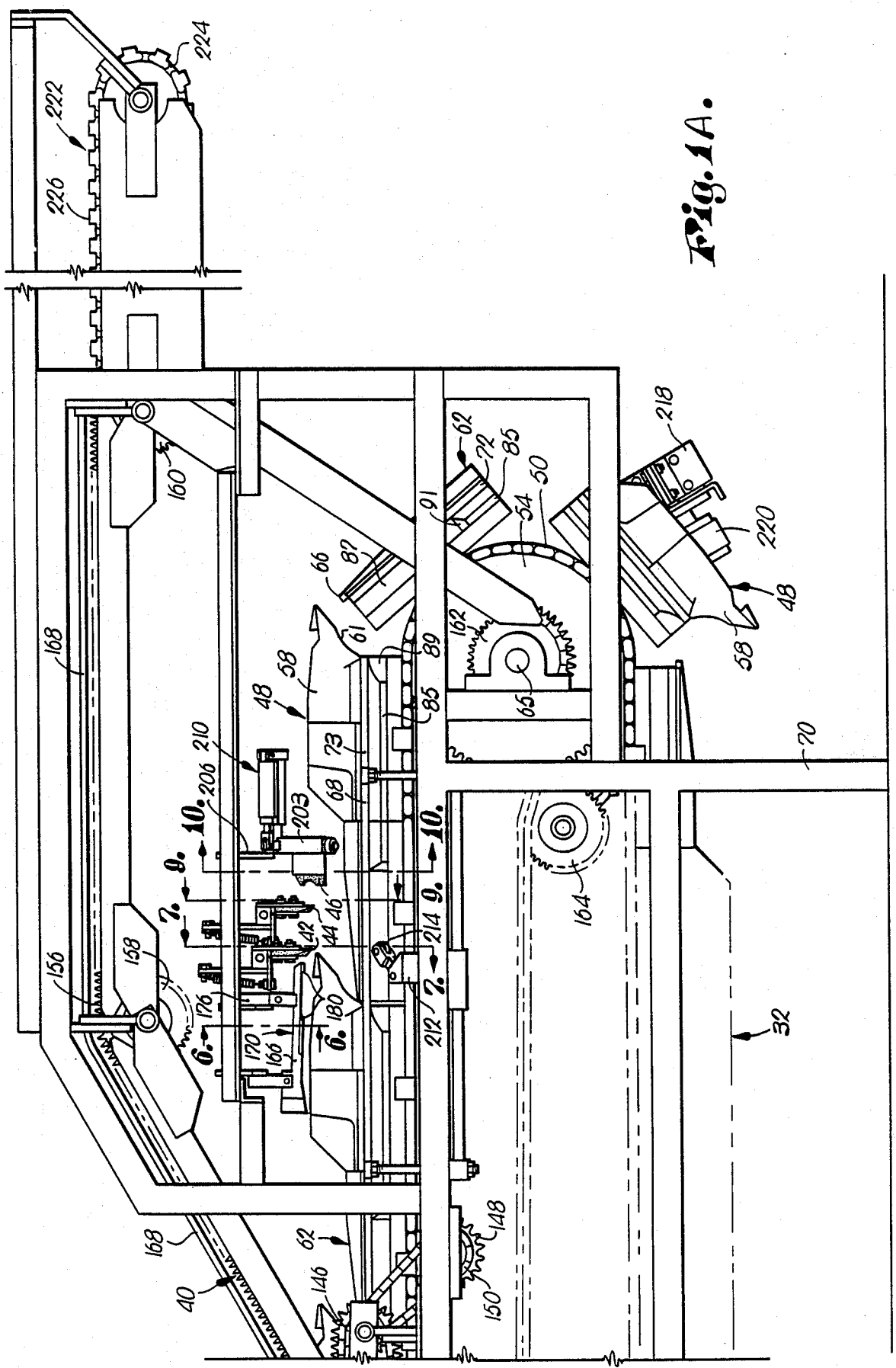

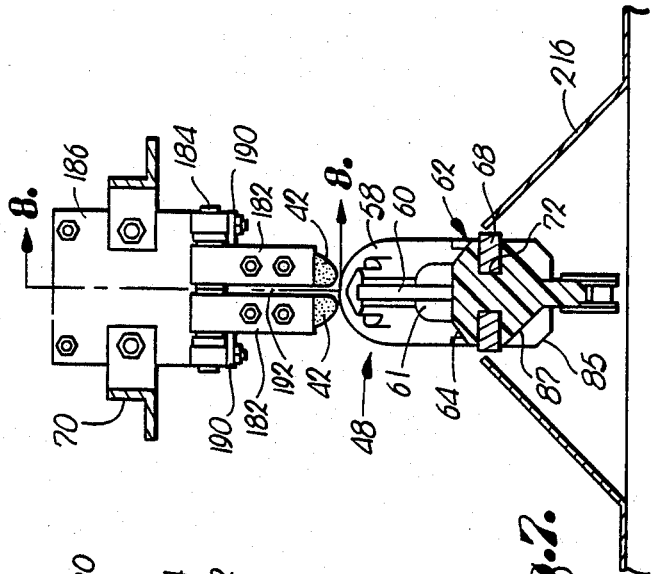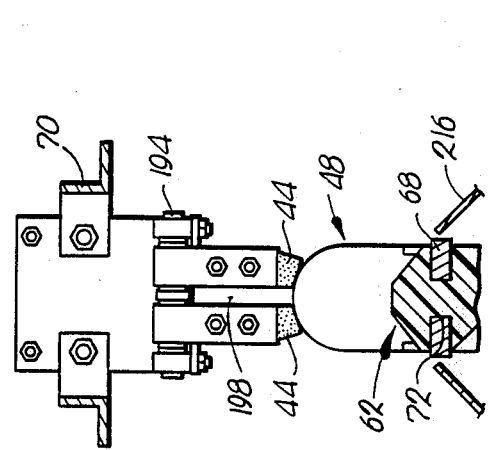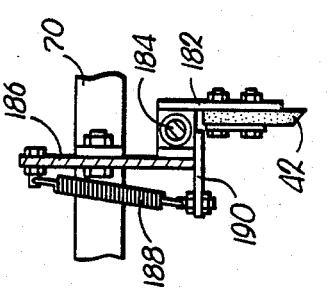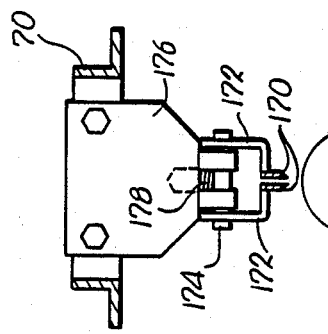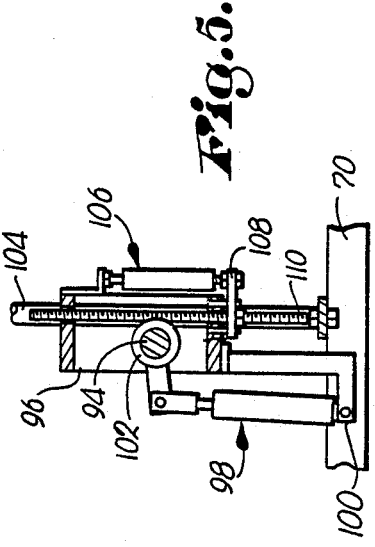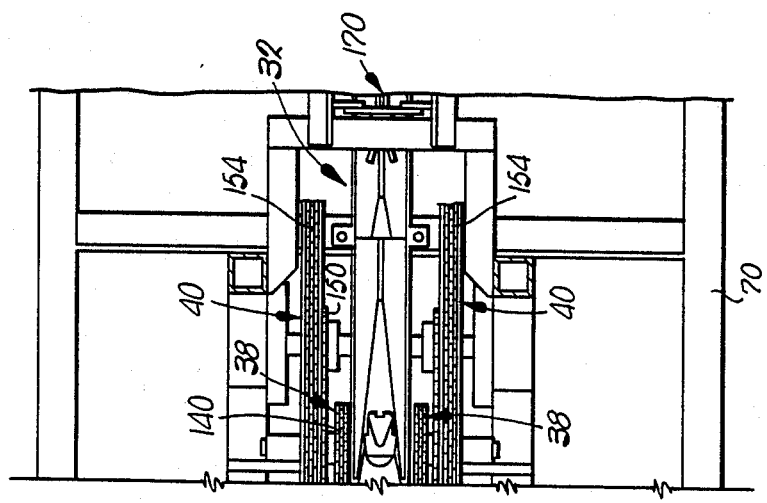

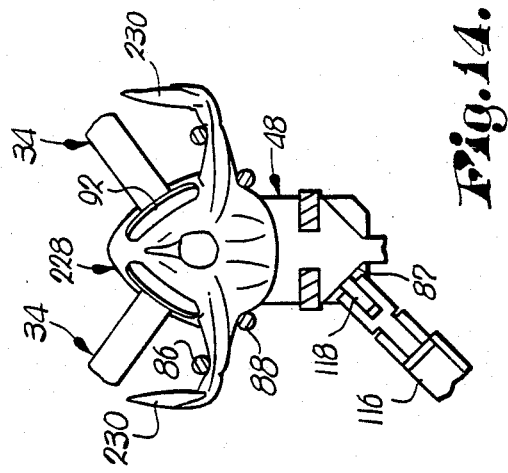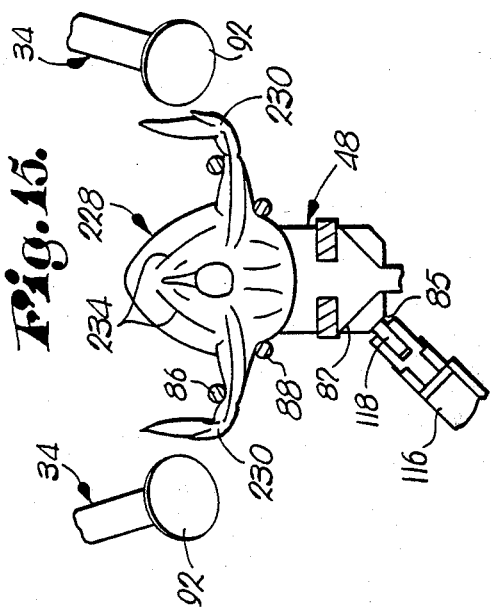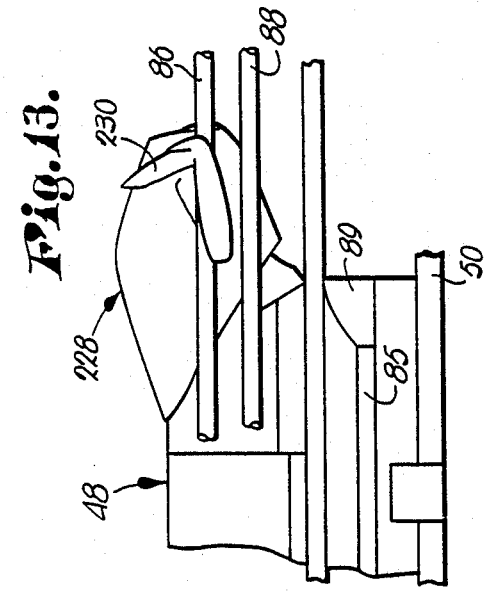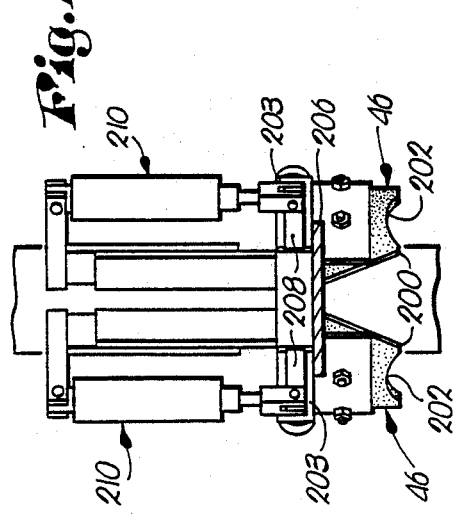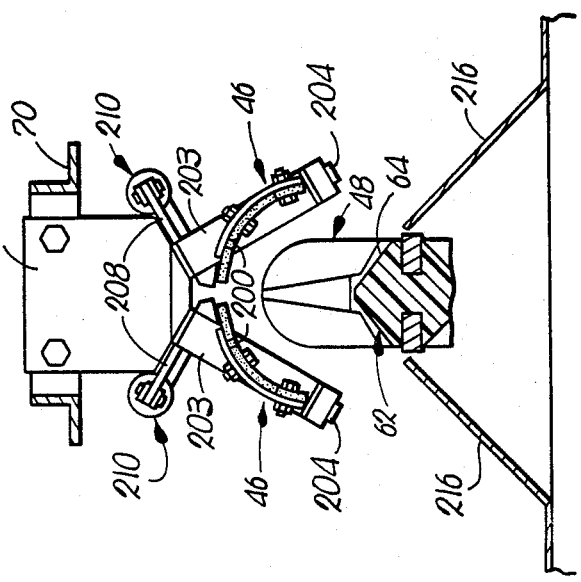

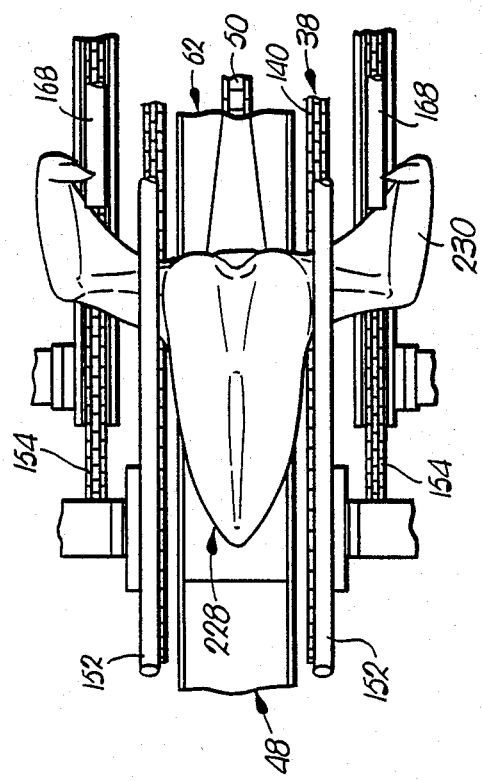

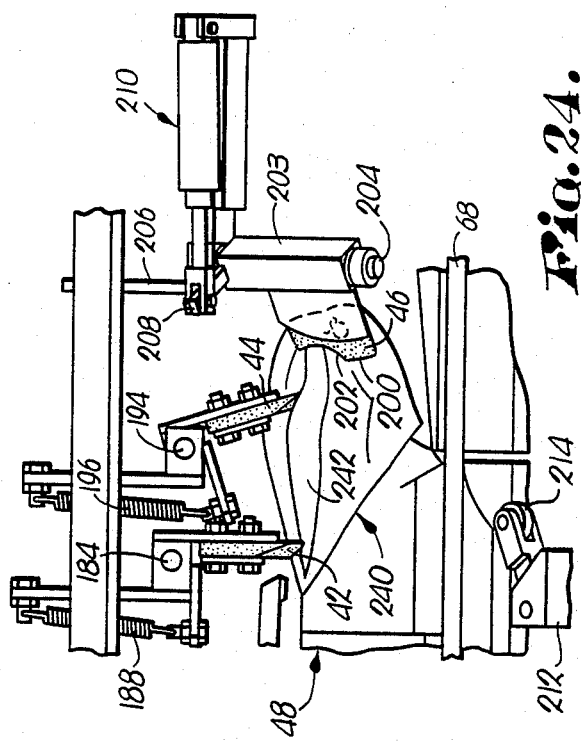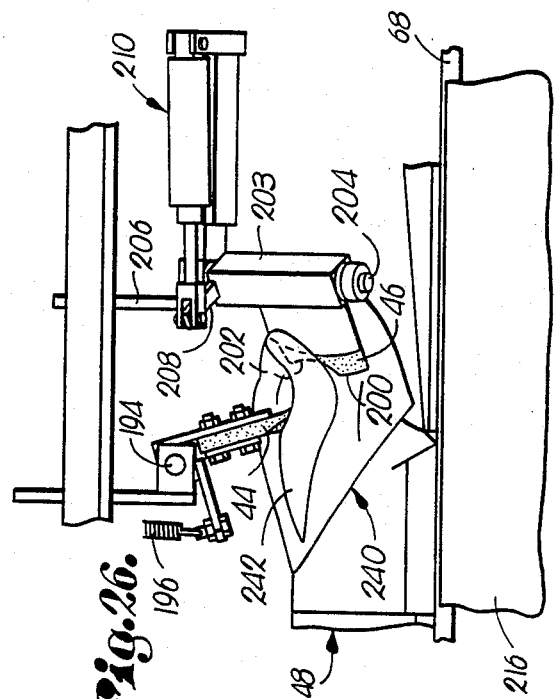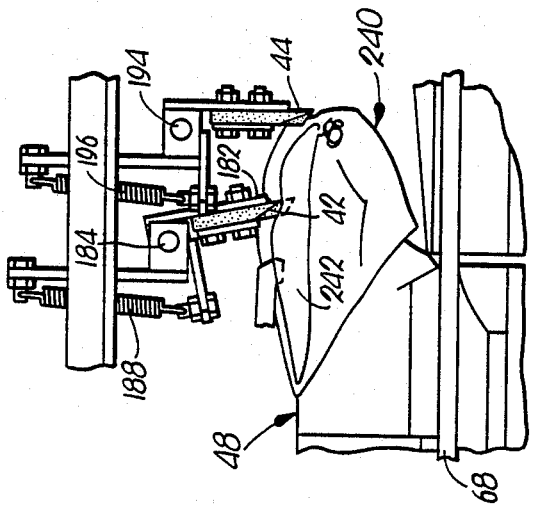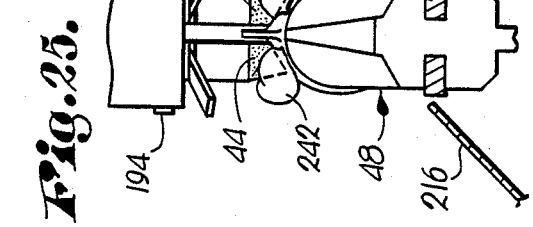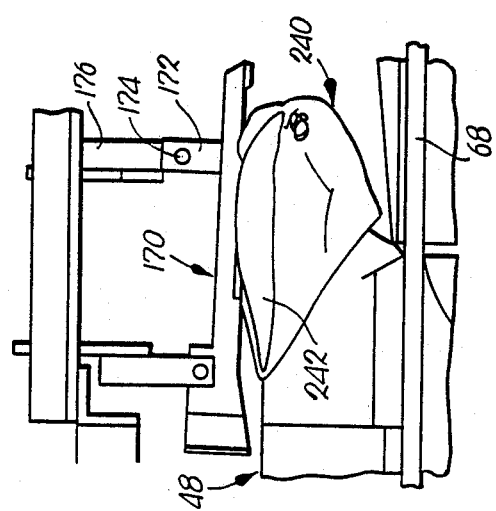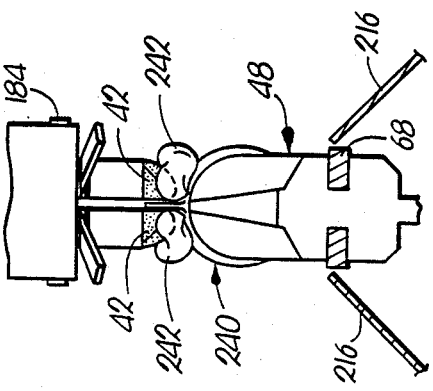

METHOD AND APPARATUS FOR REMOVING BREAST MEAT FROM POULTRY CARCASS

BACKGROUND OF THE INVENTION

1. Field of the Invention

The present invention relates to improved methods and apparatus for removing breast meat, wings and tenders from an eviscerated poultry carcass portion carried by a conveyor mandrel.

2. Description of the Prior Art

In recent times, increased interest has been directed toward poultry processing machinery which automatically removes breast meat from a section of a poultry carcass. Moreover, consumer demand has grown for chicken tenders and consequently there has been a need for apparatus which can efficiently remove tenders from the carcass as well.

U.S. Pat. No. 4,648,155 to Burnett, dated Mar. 10, 1987 describes apparatus for removing wings and connected breast meat from a section of a poultry carcass. In brief, the apparatus described in U.S. Pat. No. 4,648,155 includes a conveyor having mandrels which each carry a poultry carcass along a path of travel adjacent stationary rotary cutters which partially sever the shoulder joints between the body and the wings; subsequently the wings are grasped by an overhead conveyor which pulls the wings and breast meat connected thereto away from the carcass carried on the mandrel.

While the apparatus described and illustrated in U.S. Pat. No. 4,648,155 represents a significant advance in the art, there is a need for improving the accuracy and consistency of the cut partially severing the shoulder joints so that the wings and connected breast meat can be reliably pulled away from the carcass by the overhead conveyor without wastage. In this regard, it is to be noted that the mandrels of U.S. Pat. No. 4,648,155 carrying the carcasses toward the stationary blades move downwardly and then upwardly along a curved path in front of the blades in an attempt to partially sever front portions of the joints and associated tendons before the carcass is advanced to a location adjacent the inclined conveyor. In practice, however, it has been found that the flimsiness of the birds causes inconsistency of the cuts from one bird to another with the result that in some instances the overhead conveyor does not pull away a satisfactory amount of meat from the carcass.

The processing apparatus disclosed in U.S. Pat. No. 4,648,155 further includes a pair of rubber-faced scrapers positioned along the path of the mandrels at a location downstream of the point of intersection with the overhead conveyor. The scrapers together define an inclined, inverted U-shaped channel and engage opposite sides of the carcass to block passage of the tenders. However, chicken tenders are securely fixed to adjacent portions of the keel bone and as the carcass is extruded through the passage between the scrapers the latter engage the tenders with such force that the tenders are sometimes torn apart or converted to mush. Essentially, the scrapers of U.S. Pat. No. 4,648,155 function as a blockable or gate which impacts and obstructs the tenders to interrupt movement of the latter as the carcass continues to advance through the channel between the scrapers.

In light of the foregoing, there is need for poultry processing equipment which can reliably separate breast meat and wings from a carcass and increase the yield of the tenders without resort to operator attention or manipulation.

SUMMARY OF THE INVENTION

The present invention is directed toward improved methods and apparatus for filleting meat from a poultry carcass section in such a fashion that substantially all of the breast meat is reliably removed from the carcass and both tenders are disengaged from the keel bone of the carcass with little wastage. The apparatus efficiently processes the poultry section and consistently produces high quality fileted breast meat and tenders with little operator intervention.

In accordance with one aspect of the invention, a series of mandrels supporting poultry carcass sections are advanced along a straight, horizontal path of travel and two pairs of rotary cutters are mounted for shifting movement toward operative positions in front of the advancing carcass sections to partially sever the wing or shoulder joints in timed relation to movement of the mandrels. The first pair of rotary cutters moves toward respective positions to cut the skin and meat closely adjacent the pulley bone in generally parallel relationship to the latter. The second pair of rotary cutters is disposed downstream of the first pair of cutters and shifts in front of corresponding shoulder joints to slice through each joint and sever two of the three tendons with a cut that is inclined and slightly overlapping relative to the cut effected by the respective first cutter.

As a result, the cuts which are provided by the swinging, rotary cutters are located at essentially the same place on each bird so that the proper tendons and correct amount of skin are cleanly severed for allowing a downstream, overhead conveyor to consistently pull away the wings and connected breast meat from each carcass. The accuracy of each cut is improved since each bird is held rigidly by the mandrel while moving along a straight path during the cutting operation, in contrast to prior art machinery which lowered each bird along a curved path for tilting movement in front of stationary cutters.

Another important aspect of the present invention relates to the tenders removal structure that includes two sets of peeling fingers and a pair of wiper elements which cooperate to pare the tenders away from the sternum or keel bone. The first set of peeling fingers shaves portions of the tenders away from the center of the keel bone, and the second set of peeling fingers effect a slightly deeper cut to further partially loosen the tenders from the keel bone. The carcass then advances toward the pivotal wiping elements which swing inwardly around remaining portions of the shoulders and toward respective locations immediately behind the shoulder portions to contact the sternum and complete the paring operation so that the tenders readily fall away and toward a collection table.

Importantly, the movement of the tenders continues substantially unimpeded during the paring operation as the carcass is advanced, since the fingers slice through the connection between the tenders and the sternum and deflect the tenders only a light lateral distance toward an open passage on the opposite side of the fingers. Consequently, each tender is cleanly peeled away from the carcass and is not subject to damage due to impact with transversely disposed gates, restricted openings or the like.

In preferred forms of the invention, an intermediate conveyor is disposed along the path of travel of the mandrels upstream of the inclined conveyor and functions to grasp the partially severed wings and advance the latter at a speed which is slightly greater than the velocity of the mandrels and equal to the velocity of the inclined conveyor. The intermediate conveyor facilitates transfer and secure engagement of the wings with the inclined conveyor so that the wings and connected breast meat are reliably pulled away from the carcass which remains on the mandrel.

BRIEF DESCRIPTION OF THE DRAWINGS

FIGS. 1 and 1A together comprise a side elevational view of the poultry processing apparatus of the present invention;

FIGS. 2 and 2A together comprise a fragmentary, plan view thereof;

FIG. 5 is a fragmentary, horizontal sectional view showing mounting structure for one of the first pair of rotary cutters illustrated in FIGS. 1-3;

FIG. 6 is an enlarged, fragmentary, vertical cross-sectional view taken along line 6—6 of FIG. 1 to show a pair of knives for relieving the joint between the wishbone and the carcass;

FIG. 7 is an enlarged, fragmentary, vertical cross-sectional view taken along line 7—7 of FIG. 1 to depict a first pair of peeling fingers for partially loosening tenders from opposite sides of the carcass;

FIG. 8 is an enlarged, fragmentary, vertical cross-sectional view taken along line 8—8 of FIG. 7 to show pivotal, support structure for one of the peeling fingers;

FIG. 9 is an enlarged, fragmentary, vertical cross-sectional view taken along line 9—9 of FIG. 1 to illustrate a second pair of peeling fingers;

FIG. 10 is an enlarged, fragmentary, vertical cross-sectional view taken along line 10—10 of FIG. 1 to depict a pair of pivotally mounted wiper elements shifted toward a non-operative position;

FIG. 11 is an enlarged, fragmentary, plan view of the wiper elements shown in FIG. 10;

FIG. 12 is a view somewhat similar to FIG. 10 except that the wiper elements have shifted toward an operative position for completing the removal of the tenders from the carcass; and FIGS. 13-26 represent fragmentary, enlarged views of a poultry section passing through the various processing zones of the apparatus shown in FIGS. 1-12.

DETAILED DESCRIPTION OF THE DRAWINGS

Figure 2:
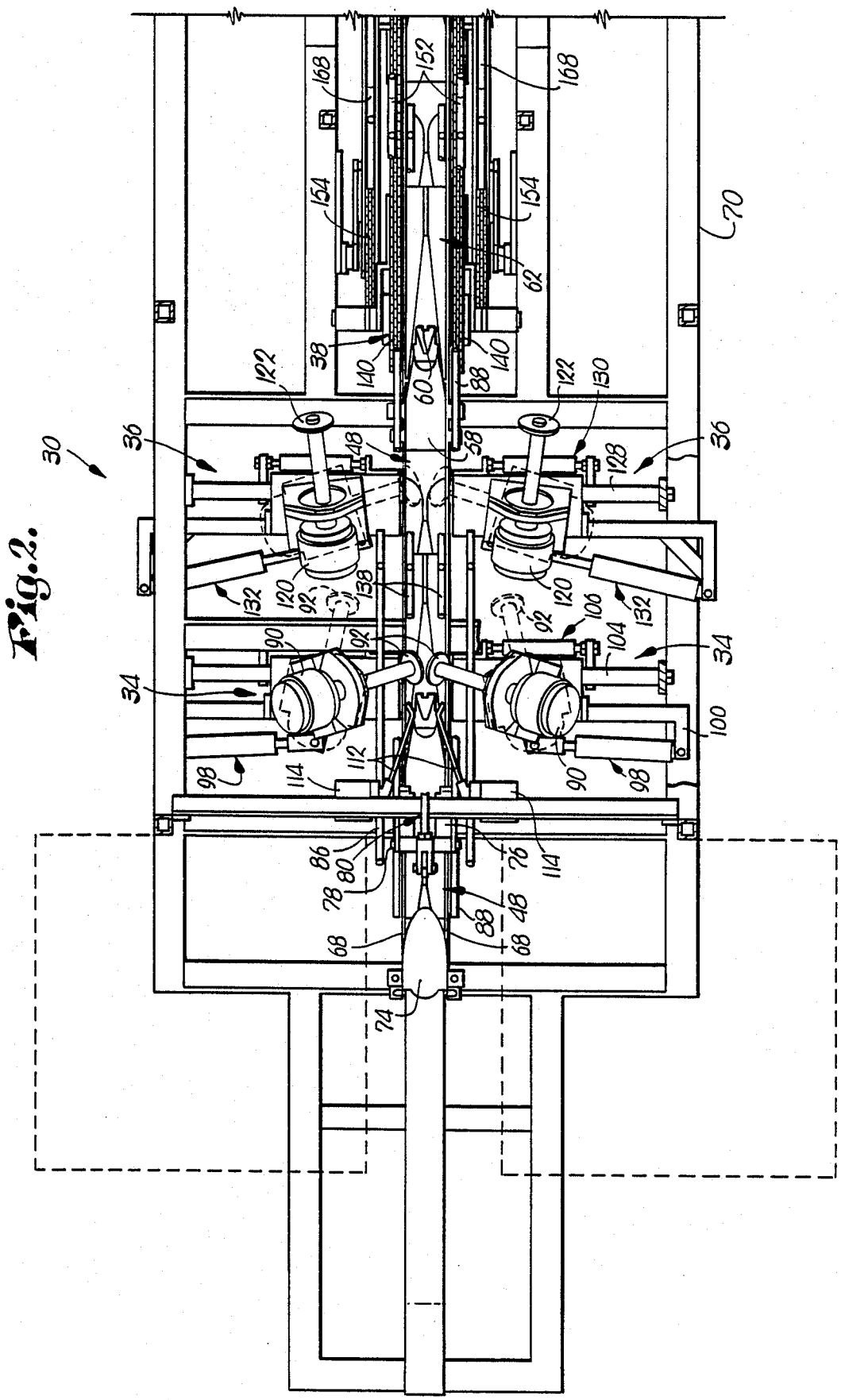

Referring initially to FIG. 1, a poultry processing apparatus 30 is shown which broadly includes a first conveyor 32 for moving a poultry carcass section along a path of travel including a cutting zone which comprises a first pair of rotary cutters 34 and a second pair of rotary cutters 36. Apparatus 30 also includes an intermediate conveyor 38 located downstream of the cutters 34, 36 and ahead of an inclined conveyor 40 for pulling the wings and connected breast meat away from the carcass. The first conveyor 32 also passes along a peeling zone where the tenders are partially loosened by two sets of peeling fingers 42, 44 and then disengaged from the carcass by a pair of wiping elements 46.

In more detail, the first conveyor 32 includes a spaced series of mandrels 48 which are carried by a roller chain 50 movable about a closed loop path of travel. The roller chain 50 is trained about a front sprocket 52 and a rear sprocket 54, the latter of which is connected by means of a drive shaft 56 to a source of rotary power such as a hydraulic motor (not shown).

Each of the mandrels 48 has a leading section 58 (in this regard, see FIGS. 1 and 2) which is of a configuration to complementally fit within a front section of an eviscerated poultry carcass. The top of the leading section 58 has a triangular configuration in plan view, and a slot 60 (FIG. 2) extends from the top of leading section 58, downwardly along the front, inclined edge of mandrel 48 and through a lower, curved portion which is referenced by the numeral 61 in the mandrels 48 depicted in FIG. 1A.

The first conveyor 32 further includes a series of intermediate heads 62 which are carried by the chain 50 in the spaces between adjacent mandrels 48. Each of the heads 62 has an upwardly facing, inclined ramp portion 64 on opposite sides thereof, and also includes a projection 66 (FIG. 1A) extending in a rearwardly direction relative to the path of travel of first conveyor 32.

The mandrels 48 and the intermediate heads 62 are supported on each side by horizontal guide bars 68 to maintain precise positioning of the carcass through its various process steps along the upper stretch of roller chain 50. The fixed guide bars 68 extend substantially along the entire length of a frame 70 of the apparatus 30, and it can be seen by reference to FIGS. 7 and 9 that the guide bars 68 ride within respective slots 72 formed in the heads 62 as well as similar slots 73 (FIG. 1) which are formed in the mandrels 48.

As illustrated in FIGS. 1 and 2, a curved shoe 74 is fixed to the frame 70 for facilitating placement of the poultry carcass sections on the moving mandrels 48. In practice, an operator stationed to one side of the apparatus 30 places the carcass section on the shoe 74 at a time before the approaching mandrel 48 reaches the shoe 74, and subsequently the leading section 58 comes into a position to engage and carry away the carcass section from the shoe 74. As a result, the operator can work "ahead" of conveyor 32 and the operator need not time his or her movements in coordination with conveyor 32 as would be necessary if the carcass sections were to be placed directly on the mandrels 48.

Immediately subsequent to the time that a poultry carcass is carried from the shoe 74 by a mandrel 48, the front edge of the carcass comes into contact with a fork 76 that engages the carcass to firmly seat the latter on the mandrel 48. The fork 76 is mounted for swinging movement about a pivot 78 between the obstructed position shown in dashed line FIG. 1 for seating the carcass section on the mandrel 48, and the full line retracted or clearance position illustrated in the same drawing.

Movement of the fork 76 about pivot 78 is effected by an air powered piston and cylinder assembly 80 which, in turn, is controlled by a pneumatic valve 82 having a cam roller 84. As the mandrel 48 moves toward the first rotary cutters 34, the cam roller 84 comes into contact with an inclined lower surface 85 (see, e.g., FIG. 7) of the mandrel 48 for extending the piston of assembly 80 and raising the fork 76 to the full line position shown in FIG. 1 in order to allow passage of the poultry carcass thereunder.

As each mandrel 48 moves from the shoe 74 toward the first rotary cutters 34, the wings of the bird enter a space between an upper guide bar 86 and a lower guide bar 88, a set of which are disposed on each side of the mandrels 48. The guide bars 86, 88 function to support the wings of the bird as the latter passes through the cutting zone.

The first pair of rotary cutters 34 of the cutting zone each include an hydraulic powered motor 90 that rotates a circular blade 92. The rotary cutters 34 are each mounted on a shaft 94 for swinging movement about respective vertical axes. The shafts 94 are supported by corresponding subframes 96 which can best be appreciated by reference to FIG. 3.

As illustrated in FIG. 5, one end of an air powered piston and cylinder assembly 98 is mounted on a bracket 100 connected to the subframe 96, and the piston of assembly 98 is pivotally connected to a collar 102 secured to the upright shaft 94. Thus, extension of the piston and cylinder assembly 98 shifts the first rotary cutter 34 about a vertical axis toward a non-operative position which is shown by the dashed lines in FIG. 2, while retraction of the piston and cylinder assembly 98 swings the corresponding rotary cutter 34 in an opposite direction toward an operative orientation which is shown by the full line position depicted in FIGS. 1, 2 and 3.

Figure 3:
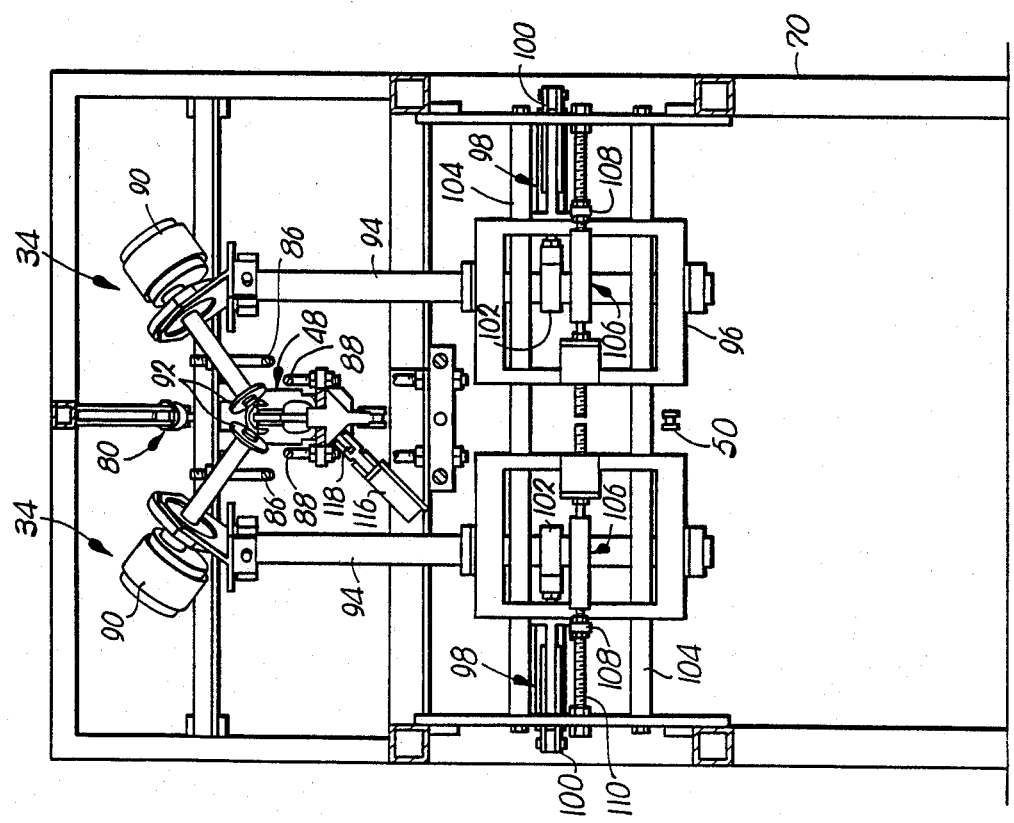
FIG. 3 is a vertical cross-sectional view taken along line 3—3 of FIG. 1 to illustrate a first pair of rotary cutters in an operative position.

Viewing FIG. 3, both of the subframes 96 are slidably mounted on a pair of horizontal guide rods 104 which are fixed to opposite sides of the frame 70. One end of an air powered piston and cylinder assembly 106 is adjustably connected by means of a member 108 to a threaded rod 110 fixed to a portion of the frame 70, while the piston of the piston and cylinder assembly 106 is secured by means of an L-shaped bracket to the subframe 96.

As illustrated in FIG. 2, a pair of arms 112 are coupled to pneumatic valves 114 and engage opposite sides of the birds as the mandrels 48 are moved along conveyor 32. If a larger bird is encountered, the arms 112 deflect outwardly and valves 114 effect shifting of the piston and cylinder assembly 106 associated with each subframe 96 in order to slightly shift the position of the vertical shafts 94 supporting the rotary cutters 34. In this manner, the distance between the blades 92 of the cutters 34 can be somewhat increased to accommodate larger carcasses.

In the operative position of the first rotary cutters 34, the longitudinal axis of shaft interconnecting the motor 90 and blade 92 extends along a reference line that is preferably inclined at a angle 35 degrees from horizontal and inclined 18 degrees from a vertical reference plane perpendicular to the path of the travel of the mandrels 48 along the upper reach of chain 50. Further, the shafts 94 supporting the cutters 34 preferably shift through an arc of about 60 degrees as the cutters 34 are moved from their operative position to their non-operative orientation.

Referring to FIG. 3, a pneumatic valve 116 is connected to a cam roller 118 that engages the aforementioned, lower inclined surfaces 85 as well as a recessed surface 87 of the head 62 during movement along their paths of travel. As the roller 118 contacts the inclined surface 87, valve 116 actuates the piston and cylinder assembly 98 to cause retraction of the latter in order to shift the rotary cutters 34 from their non-operative position to their operative position in front of the approaching bird. Subsequently, once roller 118 disengages inclined surface 87, valve 116 causes extension of the piston and cylinder assembly 98 in order to swing the rotary cutters 34 toward their respective non-operative, out-of-the-way positions for providing clearance to the passing carcass.

As can be observed in FIGS. 1A and 13, a ramp portion 89 extending rearwardly from the front end of mandrel 48 is provided to guide the cam rollers from the trailing end of inclined surface 87 and onto the front end of surface 85 of mandrel 48. The surface 85 extends rearwardly along mandrel 48 and terminates adjacent a similarly oriented surface 85 on head 62 which, in turn, is interconnected by a ramp portion 91 with surface 87 of head 62. The surfaces 85, 87 together with cam roller 118 comprise a means for moving the rotary cutters 34 toward and away from their operative position in timed, coordinated relationship to the movement of a poultry carcass mounted on mandrel 48 along its path of travel.

The blades 92 of each cutter 34 are oriented to partially cut the skin and meat adjacent the shoulder or joint between the wing and the central carcass section. The blades 92 are preferably located to cut parallel to the pulley bone in a location as close as possible to the latter without actually cutting the bone. In practice, a cut of approximately ¼ of an inch in depth has been found to provide good results for the subsequent processing steps described below. Moreover, the blades 92 are purposely dull for sliding along the pulley bone if the latter is unintentionally engaged by the blades 92 so that the pulley bone is not severed.

Figure 4:
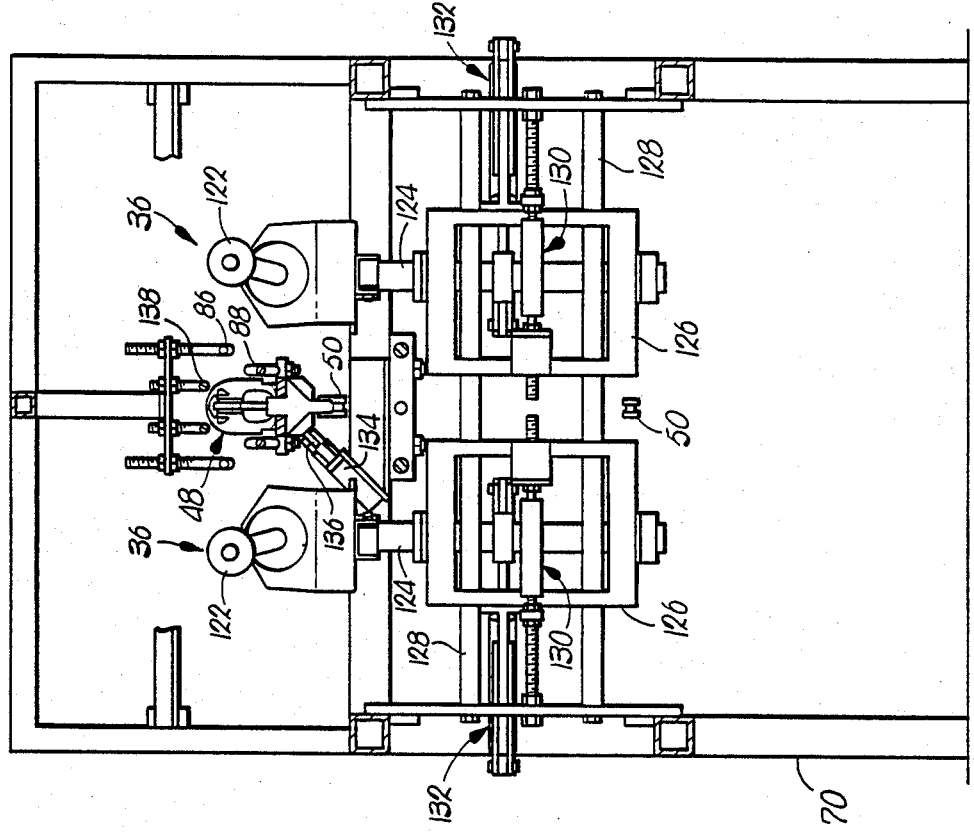
FIG. 4 is a vertical cross-sectional view taken along line 4—4 of FIG. 1, depicting a second pair of rotary cutters shifted to a non-operative position.

Each poultry carcass is then advanced to the second rotary cutters 36 which are shown, for example, in FIGS. 1, 2 and 4. The second rotary cutters 36 include an hydraulic powered motor 120 which drives a shaft that carries a circular cutting blade 122. The second rotary cutters 36 are supported on corresponding, upright shafts 124 which are supported by respective subframes 126 as can be understood by reference to FIG. 4.

Mounting structure for the second rotary cutters 36 is somewhat similar to the mounting structure for the first rotary cutters 34, in that the subframe 126 is slidably mounted on two horizontal guide rods 128 similar to rods 104. When somewhat larger birds are detected by the arms 112, valves 114 operate a pair of air powered piston and cylinder assemblies 130 (FIGS. 2 and 4) to shift the rotary cutters 36 slightly in a horizontal, outwardly direction similar to the movement of cutters 34.

The rotary cutters 36 are pivoted between an operative position and a non-operative position by means of respective piston and cylinder assemblies 132 somewhat similar to assemblies 98. A pneumatic valve 134 (FIGS. 1 and 4) is connected to a roller cam 136 that engages the inclined, lower surface 85 of each mandrel 48 as the latter advances toward the second rotary cutters 36. Once the roller cam 136 contacts surface 87, the second rotary cutters 36 are pivoted through an arc of about 82 degrees about shafts 124 from their nonoperative position which is shown in full line in FIGS. 1, 2 and 4 and to an operative position which is shown by the dashed lines in FIG. 2.

A third pair of guide bars 138 begin immediately ahead of the second rotary cutters 36 and ahead of the terminus of the guide bars 86 as shown in FIG. 1. Viewing FIG. 2, the guide bars 138 are relatively closely spaced apart and are positioned to engage and steady the breast sections as the carcasses pass by the second rotary cutters 36 and to the intermediate conveyor 38.

Referring now to FIG. 1, the intermediate conveyor 38 includes a roller chain 140 that carries a spaced series of outwardly projecting, relatively sharp teeth 142. An upstream reach of the roller chain 140 is trained about a sprocket 144 rotatably carried by the frame 70, while a downstream reach of the roller chain 140 extends around a sprocket 146. A drive sprocket 148 engages the underside of the roller chain 50 of the first conveyor 32, and drives a roller chain 150 which in turn drivingly rotates sprocket 146.

A pair of guide bars 152 begins immediately in front of the sprocket 144 of the intermediate conveyor 38, and extends upwardly at a slight angle toward the inclined conveyor 40. As shown in FIG. 1, the guide bars 88 terminate at a location immediately downstream of the front end of guide bars 152. The dip in the guide bars 88 provides clearance for swinging movement of the rotary cutters 36 when shifting toward and away from their operative positions.

The inclined conveyor 40 comprises a pair of roller chains 154, 154 which are trained about a first sprocket 156 located below the path of the travel of the moving mandrels 48 and the intermediate conveyor 38 as can be observed in FIG. 1. The roller chains 154 are also trained about a second pair of sprockets 158, a third pair of sprockets 160, a fourth pair of sprockets 162 fixedly coupled to the main drive shaft 56 as well as a pair of adjustable idler sprockets 164, although only one of each pair of sprockets 156-164 is illustrated in FIG. 1.

As shown in FIG. 2, the roller chains 154, 154 are each disposed on an exterior side of a portion of a respective one of the rollers chains 140 of the intermediate conveyor 38. In turn, the roller chains 140 of the intermediate conveyor 38 are located on corresponding, exterior sides of the mandrels 48 as the latter move along their path of travel.

Each roller chain 154 of the inclined conveyor 40 carries a spaced series of outwardly projecting, relatively sharp teeth 156 which function to receive wings of the bird which have initially been grasped and transported by the teeth 142 of the intermediate conveyor 38. Once the wings have been transferred from the intermediate conveyor 38 to the inclined conveyor 40, the wings shift along the inclined path of the conveyor 40 and are thus pulled away along with any breast meat connected thereto from the poultry carcass which remains seated on the leading section 58 of the mandrel 48 moving in a horizontal path therebelow.

A pair of guide bars 168 overlie corresponding roller chains 154 of the inclined conveyor 40. The guide bars 168 begin at a location upstream of the point of horizontal juncture between the upper reaches of the inclined conveyor 40 and the intermediate conveyor 38, and the guide bars 168 continue along the path of the inclined conveyor 40 and terminate at a position adjacent sprocket 160. The guide bars 168 are operable to retain the wings of the bird in secure engagement with the teeth 156 without slippage, especially as the wings and breast meat are pulled away from the moving carcass.

Preferably, the drive sprockets 162 for the inclined conveyor 40 are of a diameter such that the lineal velocity of the moving teeth 156 of the inclined conveyor 40 is approximately equal to the lineal velocity of the moving teeth 142 of intermediate conveyor 38. Moreover, the lineal velocity of the teeth 142 is slightly greater than the lineal velocity of mandrels 48 of the first conveyor 32. The substantially equal speeds of the intermediate conveyor 38 and inclined conveyor 40 facilitates transfer of the wings from the teeth 142 to the teeth 156, while the slightly greater speed of the teeth 156 is desirable for enhancing strippage and removal of the wings and breast meat from the carcass carried by the mandrels 48.

Once the breast meat and wings have been removed from the carcass, the mandrel 48 advances the carcass toward the peeling zone. First, the carcass encounters a pair of metallic knives 170 (FIG. 1) having angled, outwardly extending front portions which engage the ridge or keel of the sternum and guide the ridge toward the narrow space between the knives 170. In this regard, each knife 170 is loosely mounted on the depending mount 176 for limited movement of the knives 170 in lateral, horizontal directions relative to the path of travel of mandrels 48. As shown in FIG. 6, the supports 172 are suspended from a rod 174 and are spaced apart by the depending, slotted mount 176 connected to the frame 70 for free-floating independent movement in a horizontal direction.

The rod 174 supporting the knives 170 is biased downwardly by a spring 178 toward the bottom of the slotted mount 176. As a mandrel 48 continues to advance, the keel of the carcass encounters fore-and-aft horizontal sharpened edges 180 of knives 170 which loosen and release membranes between the keel bone and the tenders. The cuts provided by the sharpened edges 180 are consistantly located in the proper area due to the loose mounting structure supporting the knives 170 which enables the latter to be self-centering on opposite sides of the keel.

As the carcass passes by the trailing edges 180 of knives 170, the first pair of peeling fingers 42 is encountered. As illustrated in FIGS. 7 and 8, each of the peeling fingers 42 is fixed to a support 182 that is pivotally connected to a horizontal rod 184 that is, in turn, carried by a bracket 186 which is affixed to frame 70. Each of the peeling fingers 42 is independently swingable about rod 184, and is biased toward the upright position shown in FIGS. 1 and 7-8 by means of a relatively stiff spring 188 which interconnects bracket 186 and an arm 190 secured to support 182. Arm 190 engages the bottom of bracket 186 to normally maintain the first peeling fingers 42 in a vertical orientation.

Inner edges of the first peeling fingers 42 are preferably located a horizontal distance of $\frac{1}{4}$ inch apart to present a space which is indicated by the numeral 192 in FIG. 7. The first peeling fingers 42 are slightly further apart than the spacing between the horizontal, elongated edges 180 of the knives 170. The first peeling fingers 42, however, are located to extend into the severed area initiated by the knives 170 and are somewhat lower than the latter (see FIG. 1) in order to partially sever an upper, elongated portion of the connection between the tenders and the sternum.

The second set of peeling fingers 44 are carried by support structure similar to the structure mounting fingers 42 to frame 70. That is, each peeling finger 44 is pivotally connected to a horizontal rod 194 (FIG. 9) and is biased by a relatively stiff spring 196 (FIG. 1) toward a normally vertical orientation.

The second set of peeling fingers 44 (see FIG. 9) is spaced slightly farther apart than the first pair of peeling fingers 42. In particular, the horizontal distance between inner edges of the fingers 44 is preferably one-half inch, indicated by the numeral 198. The lower tips of the depending peeling fingers 44 are somewhat lower than the curved, lower edges of the depending peeling fingers 42 to enable the fingers 44 to effect a slice through a somewhat lower portion of the connection between the tenders and the sternum.

The carcass with the tenders partially loosened by the fingers 42, 44 next encounters the pair of wiping elements 46 which are shown in more detail in FIGS. 10-12. Each of the wiping elements 46 has a thin leading edge portion 200 with a central concavity 202 (see, e.g., FIG. 11). Each wiping element 46 is also curved in vertical planes transverse to the path of travel of mandrels 48 when the wiping elements 46 are in the positions shown in FIG. 10.

Each of the wiping elements 46 is pivotally connected by means of a bracket 203 to a corresponding upright pin 204 which is inclined from vertical and extends in a direction parallel to a reference plane transverse to the path of the travel of mandrels 48. The pins 204 are carried by a support 206 which is fixedly connected to the frame 70, and each bracket 203 is secured to a corresponding arm 208 pivotally coupled to the piston shaft of a piston and cylinder assembly 210. As shown in FIG. 11, the opposite side of the piston and cylinder assembly 210 is connected to horizontal extensions of support 206.

The dual-acting air powered piston and cylinder assemblies 210 are operable to shift the corresponding wiper elements 46 between a respective open, non-operative orientation which is shown in FIGS. 1, 10 and 11 and a closed, operative position which is depicted in FIG. 12. The piston and cylinder assembly 210 are connected to a pneumatic valve 212 (FIG. 1) which has a valve element that is connected to a cam roller 214 for engagement with the passing lower, inclined surface 85 of the mandrel 48.

The valve 212 and cam roller 214 are positioned to allow the shoulder or wing joint portions severed by the second rotary cutters 36 to pass to a location immediately downstream of the leading edge portion 200 of the wiper elements 46 while the latter are in their non-operative orientation which is shown in FIGS. 10 and 11. Immediately thereafter, however, cam roller 214 moves from contact with surface 87 and contacts the inclined surface 85 of mandrel 48; as a result, valve 212 emits air to the piston and cylinder assembly 210, thereby extending the latter and shifting the corresponding wiping elements 46 in a direction toward the mandrel 48 and toward the position shown in FIG. 12.

Advantageously, the cam roller 214 is positioned to cause the wiping elements 46 to shift and contact the carcass at a location immediately behind and downstream from the severed shoulder joint portions. Once the wiping elements 46 contact the carcass, firm engagement between the leading edge portion 200 and the carcass is provided in order to readily slice through the remaining connection between the tenders and sternum or rib cage which has not been previously cut by the peeling fingers 42, 44. As such the pivotal mounting for the wiping elements 46 enables the latter to clear the protruding joint portions, and yet firmly contact regions downstream of the portion to an extent sufficient to cleanly peel away the partially loosened tenders from the sternum.

As the tenders disengage the forwardly moving carcass, the tenders slide downwardly and normally engage the inclined ramp portions 64 of the next adjacent downstream head 62. As shown in FIG. 10, the slope and orientation of the ramp portions 64 is approximately equal to corresponding panels 216 (which have been removed from FIG. 1 clarity). The tenders thus slide down the ramp portions 64 and onto the inclined sections of the panels 216, and come to a rest at a lower, horizontal section of the panels 216 for inspection and gathering by the workers for packaging.

As the mandrels 48 continue to move in a downstream direction toward sprocket 54, the next adjacent, upstream head 62 pivots as the latter encounters the curved portion of the closed loop path of travel of conveyor chain 50. The head 62 pivots about a horizontal axis and the trailing end of the head 62, including the rearwardly extending projection 66, sweeps along the curved portion 61 of the front end of the downstream mandrel 48 to engage the carcass supported thereon and deflect the carcass slightly in a generally upward direction to unseat the firm contact between the carcass and the mandrel leading section 58 caused by fork 76. While the upper trailing end of the intermediate head 62 generally comes into contact with the end of the backbone of the bird carried by the mandrel 48, the ridge of the backbone fits within the slot 60 and the projection 66 slides along the latter to facilitate loosening of the carcass on the mandrel 48.

In most instances, the carcasses fall off of the mandrels 48 as soon as the latter are in a generally vertical orientation while moving about the curved path dictated by sprocket 54. However, should any of the carcasses fail to self-disengage from the supporting mandrel 48, such carcasses are kicked off of the same by means of paddles 218 which are fixed to a shaft connected to a hydraulic motor 220 for rotation.

Finally, the wings and connected breast meat which are advanced along the upper, horizontal stretch of the inclined conveyor 40 come into contact with a conveyor 222 which includes a pair of spaced roller chains 224 that each carry a series of outwardly projecting lugs 226. Typically, after the wings have disengaged the conveyor 40 and are carried forwardly by conveyor 222, workers positioned to each side of the latter grasp the wings and slice the wings from the connected breast meat which are then both carried to packaging containers.

OPERATION

Reference will now be made to FIGS. 13-26 where the method steps in accordance with the invention are shown in greater detail. First, and as represented by FIG. 13, a front poultry section 228 lifted by mandrel 48 from shoe 74 is advanced horizontally to cause wings 230 to enter the space between guide bars 86, 88.

As the poultry section 228 advances toward the cutting zone, the first pair of rotary cutters 34 swing inwardly toward their operative position in directions opposite that of the direction of travel of mandrel 48 and in front of the moving poultry section 228. The rotary cutters 34 slice through a portion of the skin and meat next to the pulley bone, but do not normally contact the pulley bone. The relatively dull nature of the cutting blades 92 causes the same to tend to slide along the sides of the pulley bone when encountered rather than cut the same. Note also, as shown in FIG. 14, that the guide bars 86, 88 are located to spread the wings 230 in such a manner that the first section of each wing 234 is essentially in horizontal disposition.

As the mandrel 48 continues to advance, the cam roller 118 shifts away from a recessed surface 87 of the mandrel 48 and comes into rolling contact with the inclined surface 85 of the same mandrel 48 as shown in FIG. 15. At this time, the pneumatic valve 116 extends the piston and cylinder assemblies 98 to cause the rotary cutters 34 to shift about respective shafts 94 and toward their non-operative, open position for enabling unobstructed passage of the poultry section 228 therealong. FIG. 15 shows a pair of converging, ¼ inch deep cuts 234 which have been effected by the first rotary cutters 34.

As the poultry section 228 continues to move from the first rotary cutters 34 and approach the second rotary cutters 36, cam roller 136 comes into rolling contact with the recessed surface 87 as shown in FIG. 16 to effect extension of the piston and cylinder members 130 and thereby swinging motion of the rotary cutters 36 about their corresponding, supporting shafts 124. The two circular blades 122 of the second rotary cutters 36 slice through the bones of the joints between the wings 230 and remaining major extent of the poultry section 228, as well as two of the three tendons interconnecting the same.

Next, cam roller 136 rolls upwardly to the inclined surface 85 as shown in FIG. 17 and thereby actuates the valve 134 to extend the piston and cylinder assemblies 132 so that the second rotary cutters 36 swing toward their open, non-operative positions in front of the path of travel of the moving poultry section 228. As illustrated in FIG. 17, the sharp blades 122 of the second rotary cutters 36 establish two converging cuts 236 which are slightly overlapping with respect to the cuts 234 provided by the first rotary cutters 34.

Continued movement of the poultry section 228 along first conveyor 30 causes wing 230 to pass underneath a corresponding guide bar 152 as depicted in FIG. 18. At the same time, the wings 230 engage the intermediate conveyor 38 therebelow which is moving at a slightly greater speed than the velocity of the mandrels 48. The greater velocity of the intermediate conveyor 38 moves the wings ahead of their normal position spreading the wings 230 outwardly to a greater extent then previously established in order to facilitate transfer of the wings 230 from the intermediate conveyor 38 to the inclined conveyor 40.

As the wings 230 engage the inclined conveyor 40, the wings 230 pass underneath the guide bars 168 to prevent disengagement from the conveyor teeth 156. Inasmuch as the lineal speed of the intermediate conveyor 38 is substantially equal to the lineal speed of inclined conveyor 40, transfer of the wings 230 is accomplished in a relatively smooth fashion without misfeeds or jamming.

As the wings 230 continue to move upwardly along the length of inclined conveyor 40, the wings 230 and the connected breast meat 238 are pulled away from a carcass 240 of the poultry sections 228. The carcass 240 is shown in FIG. 20, where it can be seen that the second rotary cutters 36 have sliced through the shoulder joints to leave a slight, boney protrusion 241.

While the wings 230 and the connected breast meat 238 move upwardly toward the final conveyor 222, the carcass 240 continues along the first conveyor 32 and encounters knives 170 which effect slight cuts along the top the carcass 240 to relieve the connections between the wishbone, the carcass 240 and the tenders as is shown in FIG. 21. Next, and with reference to FIG. 22, the carcass 240 passes to the peeling zone and particularly to the first set of peeling fingers 42 which enter the cuts initiated by the knives 170. The peeling fingers 42 extend downwardly closely adjacent the keel bone and peel away an upper portion of the connection between a chicken tender 242 and the keel bone therebehind.

As the carcass 240 continues to advance, the second set of peeling fingers 44 enter the sliced regions initiated by the first peeling fingers 42 to extend the cut somewhat deeper. Comparing FIGS. 22 and 23 which depict the cuts effected by the first peeling fingers 42, and FIGS. 24 and 25 which depict the cuts provided by the second peeling fingers 44, it can be appreciated that the latter set of fingers follows in the path provided by the first peeling fingers but extends somewhat lower in order to gradually loosen each tender 242 from the keel bone of carcass 240.

Finally, and as shown in FIGS. 24 and 26, the carcass 240 is advanced by mandrel 48 to such a position to cause the cam roller 214 to engage the inclined surface 85 of the mandrel 48 and cause the wiping elements 46 to shift toward their closed, operative engagement in firm engagement with the moving carcass 240. The cam rollers 214 are positioned to ensure that the concave segment of the leading edge portion 200 of wiping element 46 first comes into contact with the carcass 240 at a location immediately behind the boney projections 241. The wiping elements 246 remain in firm engagement with the carcass 240 as the latter is advanced and thereby shave apart the remaining connection between the tenders 242 and the carcass 240 to enable the tenders 240 to drop along the ramp portions 64 of the trailing intermediate heads 62 and on to the inclined panel 216 therebelow.

During passage of the carcass 240 through the peeling zone, the peeling fingers 42, 44 may perhaps swing in a rearwardly direction against the bias of springs 188, 196 as illustrated in FIGS. 22 and 24. However, the fingers 42, 44 are relatively narrow in cross section and do not block or obstruct passage of the tenders 242. Instead, the fingers 42, 44 merely slice the tenders 242 away from carcass 240 and allow the passage of the tenders 242 to continue uninterrupted so that substantially all of the tenders 242 are removed in satisfactory condition and not subject to excessive, blockading forces.

We claim:

1. A method of removing poultry tenders from a carcass presenting a keel bone and shoulder portions adjacent said tenders comprising the steps of
    advancing a poultry carcass along a path of travel with a keel bone positioned in an upwardly facing direction;
    partially loosening tenders from each side of said carcass as the latter moves along said path of travel; and
    shifting a pair of wiper elements toward said carcass to peel the partially loosened tenders away from said carcass,
    said step of shifting said wiper elements toward said carcass being carried out in such a fashion that said wiper elements first engage said carcass at locations immediately behind respective shoulder portions of the carcass.

2. The method as set forth in claim 1, wherein said step of partially loosening the tenders from the carcass includes the step of initially peeling a first, upper portion of each tender away from the carcass with a first pair of peeling fingers, and also includes the step of subsequently peeling away a second, lower portion of said tenders from said carcass with a second pair of peeling fingers.

3. In a method of removing tenders from opposite sides of the sternum of a poultry carcass, the improvement comprising:
   advancing the carcass along a path of travel with the tenders exposed for removal and extending in a longitudinal direction with respect to the path of travel;
   making a pair of incisions on opposite sides of the sternum between the respective tenders and the sternum as the carcass advances;
   entering the incisions from the leading ends of the tenders with structure capable of progressively enlarging the incisions and wedging the tenders away from the sternum without completely detaching the tenders from the carcass as the structure moves relatively along the length of the sternum during continued advancement of the carcass; and
   following partial detachment of the tenders from the carcass by the wedging structure, completing separation of the tenders from the carcass with means other than said structure.

4. In a method for removing tenders from a poultry carcass as claimed in claim 3, said entering step being carried out with a pair of structures disposed in spaced succession along the path of travel of the carcass with the second structure positioned to enter the incisions more deeply than the first of said structures.

5. In a method for removing tenders from a poultry carcass as claimed in claim 3, said step of completing separation of the tenders from the carcass being carried out while the carcass continues to advance along said path of travel and including the step of engaging opposite sides of the carcass with scraping surfaces which project laterally outwardly beyond the tenders and block movement of the tenders past the surfaces.

6. In a method for removing tenders from a poultry carcass as claimed in claim 5, said scraping surfaces shifting transversely of the path of travel and into said engagement with the carcass following movement of the leading end of the carcass past the scraping surfaces.

7. Poultry processing apparatus for removing tenders from the front half of a poultry carcass presenting opposed shoulder portions comprising:
   means for conveying a front half of a poultry carcass along a path of travel with the keel bone of said carcass facing in an upwardly direction;
   at least one pair of peeling fingers extending downwardly toward said conveyor means for loosening the tenders from said carcass as the latter passes along said path of travel;
   a pair of wiper elements disposed downstream of at least one pair of peeling fingers relative to the path of travel of said carcass,
   each of said wiper elements being mounted for shifting movement toward and away from said carcass as the latter is advanced along said path of travel; and
   means for shifting said wiper elements toward said carcass in timed, coordinated movement relative to the movement of said carcass along said path of travel for contact with said carcass at respective locations immediately behind the shoulder portions in order to peel the loosened tenders away from the carcass.

8. The invention as set forth in claim 7, wherein said wiper elements each have a curved marginal edge section complemental in configuration to said poultry carcass for contact with the latter.

9. The invention as set forth in claim 7, wherein said wiper elements are mounted for pivotal movement about respective inclined axes.

10. The invention as set forth in claim 7, wherein at least one pair of peeling fingers are mounted for yielding, pivotal movement in directions along the path of travel of said carcass.

11. In apparatus for removing the tenders from opposite sides of the sternum of a poultry carcass, the improvement comprising:
   conveyor means for advancing carcasses successively along a path of travel with the tenders exposed and their longitudinal axes extending generally parallel to said path of travel;
   knife means positioned alongside said path of travel for making a pair of opening incisions on opposite sides of the sternum between the latter and the respective tenders as the carcass advances;
   wedge structure positioned alongside said path of travel for entering said opening incisions from the leading ends thereof as the carcass advances and for progressively yet not completely separating the tenders from the sternum as the structure moves relatively along the length of the sternum,
   said wedge structure including a pair of wedging surfaces disposed for location on opposite sides of the sternum and extending outwardly therefrom in a direction transverse to said path of travel,
   each of said wedging surfaces having a width which is less than the width of the corresponding tenders to be engaged thereby so that the wedging surfaces pass between the tenders and the corresponding side of the sternum as the wedge structure moves relatively along the length of the sternum; and
   means in addition to said wedge structure and downstream therefrom for completing removal of the tenders from the carcass following initial loosening thereof by the wedge structure.

12. Apparatus for removing the tenders from poultry carcasses as claimed in claim 11, said wedge structure including a second pair of wedging surfaces downstream from said first mentioned pair of wedging surfaces and disposed to enter said incisions more deeply than the first mentioned pair of wedging surfaces for additional loosening of the tenders from the sternum before operation of said means for completing removal.

13. Apparatus for removing the tenders from poultry carcasses as claimed in claim 11, said wedge structure being yieldably resilient.

14. Apparatus for removing the tenders from poultry carcasses as claimed in claim 11, said means for completing removal of the tenders from the carcass including a pair of separate scrapers positioned on opposite sides of said path of travel and provided with means for shifting the same into engagement with the carcass immediately following movement of the leading end of the carcass past the scrapers, each of said scrapers having a surface disposed to extend outwardly from the sternum in a tranverse direction and for a distance greater than the width of each tender when the scrapers are in engagement with the carcass, whereby to prevent the tenders from moving past the scrapers.

* * * * *